United States Patent
Ryu et al.

(10) Patent No.: US 9,000,119 B2
(45) Date of Patent: *Apr. 7, 2015

(54) POLYMERIZABLE COMPOSITION FOR OPTICAL MATERIAL, OPTICAL MATERIAL, AND METHOD FOR PRODUCING OPTICAL MATERIAL

(75) Inventors: Akinori Ryu, Arao (JP); Seiichi Kobayashi, Omuta (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/850,275

(22) Filed: Aug. 4, 2010

(65) Prior Publication Data

US 2011/0034660 A1    Feb. 10, 2011

Related U.S. Application Data

(60) Provisional application No. 61/231,404, filed on Aug. 5, 2009.

(30) Foreign Application Priority Data

Aug. 5, 2009 (JP) ................................. 2009-182125
Feb. 1, 2010 (JP) ................................. 2010-020677

(51) Int. Cl.
    C08G 18/32  (2006.01)
    G02B 1/04   (2006.01)
    C08G 18/38  (2006.01)
    C08G 18/72  (2006.01)
    C08G 18/73  (2006.01)
    C08G 18/76  (2006.01)

(52) U.S. Cl.
    CPC . *G02B 1/041* (2013.01); *G02B 1/04* (2013.01); *C08G 18/3206* (2013.01); *C08G 18/3876* (2013.01); *C08G 18/724* (2013.01); *C08G 18/73* (2013.01); *C08G 18/7621* (2013.01)

(58) Field of Classification Search
    USPC ...................................................... 528/60, 81
    See application file for complete search history.

(56) References Cited

U.S. PATENT DOCUMENTS

| | | | | |
|---|---|---|---|---|
| 3,132,976 A | * | 5/1964 | Klager et al. ................. | 149/19.4 |
| 3,600,359 A | * | 8/1971 | Miranda et al. ............... | 558/240 |
| 4,465,755 A | * | 8/1984 | Kiritani et al. ............. | 430/110.2 |
| 5,126,388 A | | 6/1992 | Nagata et al. | |
| 6,887,401 B2 | * | 5/2005 | Keita et al. ..................... | 264/1.1 |
| 2003/0125410 A1 | | 7/2003 | Keita et al. | |
| 2004/0026658 A1 | | 2/2004 | Yoshimura et al. | |
| 2007/0027285 A1 | | 2/2007 | Gunatillake et al. | |
| 2010/0292430 A1 | | 11/2010 | Ryu et al. | |

FOREIGN PATENT DOCUMENTS

| | | |
|---|---|---|
| CN | 1405198 A | 3/2003 |
| JP | 63-046213 A | 2/1988 |
| JP | 64-045611 A | 2/1989 |
| JP | 1-295202 A | 11/1989 |
| JP | 2-000802 A | 1/1990 |
| JP | 2-153302 A | 6/1990 |
| JP | 08-073732 A | 3/1996 |
| JP | 2007-186595 A | 7/2007 |
| JP | 2008-174520 A | 7/2008 |
| JP | 2008-255221 A | 10/2008 |
| JP | 5226016 B2 | 7/2013 |
| WO | WO 2009/098887 A1 | 8/2009 |

OTHER PUBLICATIONS

Coatings formulation: an international textbook, Bodo Müller and Urlich Poth, Vincentz Network GmbH & Co KG, 2006, pp. 99.*
Paint and coating testing manual: fourteenth edition of the Gardner-Sward handbook, J. V. Koleske, ASTM International, 1995, pp. 90.*
International Search Report (PCT/ISA/210) issued on Nov. 16, 2010, by Japanese Patent Office as the International Searching Authority for International Application No. PCT/JP2010/004901.

* cited by examiner

*Primary Examiner* — Richard A Huhn
(74) *Attorney, Agent, or Firm* — Buchanan, Ingersoll & Rooney PC

(57) ABSTRACT

A polymerizable composition for an optical material containing tolylene diisocyanate, an aliphatic polyisocyanate having 4 to 8 carbon atoms and one or more polythiols selected from pentaerythritol tetrakismercaptoacetate and pentaerythritol tetrakismercaptopropionate, is provided.

12 Claims, No Drawings

POLYMERIZABLE COMPOSITION FOR OPTICAL MATERIAL, OPTICAL MATERIAL, AND METHOD FOR PRODUCING OPTICAL MATERIAL

This application is based on Japanese patent application No. 2009-182125, No. 2010-20677, and U.S. provisional patent application No. 61/231,404, the content of which is incorporated hereinto by reference.

BACKGROUND

1. Technical Field

The present invention relates to a polymerizable composition for an optical material, and more particularly, to a polymerizable composition for an optical material containing a specific polyisocyanate and a specific polythiol compound. The invention also relates to an optical material obtainable from this polymerizable composition for an optical material, and a method for producing this optical material.

2. Related Art

Plastic materials have been traditionally used as a substituent for inorganic materials in the application of optical parts. These plastic materials are lightweight and are not susceptible to breakage, and can be tinted, as compared with the inorganic materials that have hitherto been used. Therefore, plastic materials are being preferentially used. Particularly, plastic materials having high refractive index are desirable for optical parts such as lenses, and suggested examples of such plastic materials having high refractive index include sulfur-containing urethane (thiourethane) resins described in Japanese Unexamined Patent Publication Nos. H02-153302 (1990-153302), H01-295202 (1989-295202), H02-000802 (1990-000802), S63-046213 (1988-046213), S64-045611 (1989-045611).

SUMMARY

However, aromatic thiourethane resins for which practicalization has been difficult in the conventional technologies from the viewpoint of color, even though being materials having high refractive index, can now be used for practical purposes, as a result of development of additives such as a bluing agent. On the other hand, in recent years, it is desirable to use plastic materials even in those optical parts used in applications where high durability is demanded. Among such plastic materials, a material having less change in optical properties over time, especially in color, that is, a material having high light resistance, is demanded.

Meanwhile, many of plastic materials having high refractive index exhibit low tinting property of the base material. Thus, those plastic materials are not satisfactory for applications of optical parts where high tinting property is demanded, and an improvement of tinting property is now in demand. Furthermore, there have been demands for improvements in refractive index and heat resistance; however, heat resistance and tinting property are in a trade-off relationship, such that, in general, when heat resistance increases, tinting property is decreased.

The present inventors found that a material having a high refractive index and having both high heat resistance and high tinting property can be obtained by using a polyisocyanate formed from a specific isocyanate and a specific polythiol compound in combination, thus completing the invention.

Specifically, the invention includes the following.

(1) In one embodiment, there is provided polymerizable composition for an optical material, containing tolylene diisocyanate, an aliphatic polyisocyanate having 4 to 8 carbon atoms, and one or more polythiols selected from pentaerythritol tetrakismercaptoacetate and pentaerythritol tetrakismercaptopropionate.

(2) The polymerizable composition for an optical material according to (1), wherein the aliphatic polyisocyanate having 4 to 8 carbon atoms is one or more polyisocyanate selected from 1,6-hexamethylene diisocyanate and 1,5-pentamethylene diisocyanate.

(3) The polymerizable composition for an optical material according to (1) or (2), further including an active hydrogen compound containing two or more active hydrogen groups in the molecule.

(4) In another embodiment, there is provided an optical material obtained by curing the polymerizable composition for an optical material according to any one of (1) to (3).

(5) In further another embodiment, there is provided a method for producing an optical material, the method including the polymerizable composition for an optical material according to any one of (1) to (3).

(6) The method for producing an optical material according to (5), wherein the polymerizable composition for an optical material is molded by cast polymerization.

According to the invention, a polymerizable composition for an optical material having a high refractive index, high heat resistance and further having satisfactory tinting property, and an optical material obtainable from this polymerizable composition can be provided.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Hereinafter, embodiments of the invention will be described.

The polymerizable composition for an optical material of a one embodiment contains tolylene diisocyanate, an aliphatic polyisocyanate having 4 to 8 carbon atoms and one or more polythiols selected from pentaerythritol tetrakismercaptoacetate and pentaerythritol tetrakismercaptopropionate.

As the tolylene diisocyanate according to the invention, 2,4-tolylene diisocyanate and 2,6-tolylene diisocyanate may be used individually or as a mixture. When a mixture of 2,4-tolylene diisocyanate and 2,6-tolylene diisocyanate is used, the content of 2,4-tolylene diisocyanate is preferably 60% or more, and more preferably 75% or more. When a mixture is not used, 2,4-tolylene diisocyanate is preferred. Examples of commercially available tolylene diisocyanate include Cosmonate T-100 and Cosmonate T-80 manufactured by Mitsui Chemicals, Inc., or the like.

The aliphatic polyisocyanate having 4 to 8 carbon atoms according to the invention is a linear or branched aliphatic polyisocyanate having 4 to 8 carbon atoms, and is preferably a linear diisocyanate. Specific examples of the aliphatic polyisocyanate having 4 to 8 carbon atoms include tetramethylene diisocyanate, pentamethylene diisocyanate, hexamethylene diisocyanate, pentamethylene diisocyanate, and octamethylene diisocyanate. From the viewpoint of availability, handlability, and heat resistance of the obtained resin, 1,6-hexamethylene diisocyanate and 1,5-pentamethylene diisocyanate are preferred.

In addition to the tolylene diisocyanate and aliphatic polyisocyanate having 4 to 8 carbon atoms, another isocyanate compound can be used (hereinafter, the isocyanate compound other than tolylene diisocyanate and the aliphatic polyisocyanate having 4 to 8 carbon atoms will be referred to as "other isocyanate compound"). Examples of the other isocyanate compound include:

aliphatic polyisocyanate compounds such as 2,2,4-trimethylhexamethylene diisocyanate, 2,4,4-trimethylhexamethylene diisocyanate, lysine diisocyanatomethyl ester, and lysine triisocyanate;

alicyclic polyisocyanate compounds such as isophorone diisocyanate, bis(isocyanatomethyl)cyclohexane, dicyclohexylmethane diisocyanate, dicyclohexyldimethylmethane isocyanate, 2,5-bis(isocyanatomethyl)-bicyclo[2.2.1]-heptane, 2,6-bis(isocyanatomethyl)-bicyclo[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane (additionally, 2,5-bis(isocyanatomethyl)-bicyclo[2.2.1]-heptane and 2,6-bis(isocyanatomethyl)-bicyclo[2.2.1]-heptane can be produced by the production methods described in WO 2008/001490, Japanese Unexamined Patent Publication No. H03-095151 (1991-095151), Japanese Unexamined Patent Publication No. 2003-055327, Japanese Unexamined Patent Publication No. 2003-055328, Japanese Unexamined Patent Publication No. H03-081255 (1991-081255), Japanese Unexamined Patent Publication No. H03-109361 (1991-109361), Japanese Unexamined Patent Publication No. H03-181446 (1991-181446), Japanese Unexamined Patent Publication No. 2001-089424, and Japanese Unexamined Patent Publication No. H07-309827 (1995-309827), and the compounds may be used individually or may be used as a mixture. When the compounds are used as a mixture, the mixing ratio may be optional);

aromatic polyisocyanate compounds such as 4,4'-diphenylmethane diisocyanate, diphenyl sulfide-4,4-diisocyanate, and phenylene diisocyanate;

heterocyclic polyisocyanate compounds such as 2,5-diisocyanateothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane;

or the like, but the examples are not limited to these exemplary compounds.

Furthermore, in addition to tolylene diisocyanate and the aliphatic polyisocyanate having 4 to 8 carbon atoms, compounds obtained by substituting some of the isocyanate groups of the above-mentioned isocyanate compound with isothiocyanate groups, can also be used.

Examples of such isothiocyanate compounds include aliphatic polyisothiocyanate compounds such as hexamethylene diisothiocyanate, lysine diisothiocyanatomethyl ester, lysine triisothiocyanate, m-xylylene diisothiocyanate, bis(isothiocyanatomethyl) sulfide, bis(isothiocyanatoethyl) sulfide, and bis(isothiocyanatoethyl) disulfide;

alicyclic polyisothiocyanate compounds such as isophorone diisothiocyanate, bis(isothiocyanatomethyl)cyclohexane, dicyclohexylmethane diisothiocyanate, cyclohexane diisothiocyanate, methylcyclohexane diisothiocyanate, 2,5-bis(isothiocyanatomethyl)-bicyclo[2.2.1]-heptane, 2,6-bis(isothiocyanatomethyl)-bicyclo[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, and 4,9-bis(isothiocyanatomethyl)tricyclodecane;

aromatic polyisothiocyanate compounds such as tolylene diisothiocyanate, 4,4-diphenylmethane diisothiocyanate, and diphenyl disulfide-4,4-diisothiocyanate;

sulfur-containing heterocyclic polyisothiocyanate compounds such as 2,5-diisothiocyanatothiophene, 2,5-bis(isothiocyanatomethyl)thiophene, 2,5-isothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis(isothiocyanatomethyl)-1,3-dithiolane;

or the like, but the examples are not limited to these exemplary compounds.

Furthermore, halogen-substituted forms such as chlorine-substituted forms and bromine-substituted forms; alkyl-substituted forms; alkoxy-substituted forms; and nitro-substituted forms of these isocyanate compounds, or prepolymer type modification products with polyhydric alcohols, carbodiimide modification products, urea modification products, biuret modification products, or dimerized reaction products or the like can also be used as the other isocyanate compound. These isocyanate compounds can be used individually or as mixtures of two or more kinds.

The ratio of composition by weight of tolylene diisocyanate (A) and the aliphatic polyisocyanate having 4 to 8 carbon atoms (B) is not particularly limited. However, the ratio of composition by weight of A/B is preferably 58 to 98/42 to 2, more preferably 58 to 90/42 to 10, even preferably 58 to 90/42 to 15. In this range, well-balanced optical material having heat resistance and tinting property can be obtained.

According to the invention, an active hydrogen compound may be further added. The active hydrogen compound used in the invention is a compound having at least two or more active hydrogen groups. Examples of the active hydrogen group include a hydroxyl group and a mercapto group. The active hydrogen compound is preferably an aliphatic or aromatic active hydrogen compound having 1 to 12 carbon atoms, more preferably an aliphatic or aromatic active hydrogen compound having 1 to 8 carbon atoms, and even more preferably an aliphatic active hydrogen compound having 1 to 8 carbon atoms. The active hydrogen compound may contain an ether bond, an ester bond, a sulfide bond or a disulfide bond in the molecule.

Specific examples include compounds containing a mercapto group and a hydroxyl group, such as 2-mercaptoethanol, 3-mercaptopropanol, 4-mercaptobutanol, 5-mercaptopentanol, 6-mercaptohexanol, 7-mercaptoheptanol, 8-mercaptooctanol, 3-mercapto-1,2-propanediol, glycerin bis(mercaptoacetate), 4-mercaptophenol, and 2,3-dimercapto-1-propanol; compounds containing hydroxyl groups, such as ethylene glycol, diethylene glycol, triethylene glycol, 1,3-propylene glycol, dipropylene glycol, 1,4-butanediol, 1,3-butanediol, 1,5-pentanediol, 1,4-pentanediol, 1,3-pentanediol, 1,6-hexanediol, 1,5-hexanediol, 1,4-hexanediol, 1,3-hexanediol, 1,2-cyclohexanediol, 1,3-cyclohexanediol, 1,4-cyclohexanediol, 1,7-heptanediol, 1,8-octanediol, trimethylolethane, trimethylolpropane, pentaerythritol, sorbitol, xylitol, 1,2-dihydroxybenzene, 1,3-dihydroxybenzene, 1,4-dihydroxybenzene, m-xylene glycol, p-xylene glycol, and o-xylene glycol; and compounds containing mercapto groups, such as methanedithiol, 1,2-ethanedithiol, 1,2,3-propanetrithiol, 1,2-cyclohexanedithiol, bis(2-mercaptoethyl) ether, tetrakis(mercaptomethyl)methane, diethylene glycol bis(2-mercaptoacetate), diethylene glycol bis(3-mercaptopropionate), ethylene glycol bis(2- mercaptoacetate), ethylene glycol bis(3-mercaptopropionate), bis(mercaptomethyl) sulfide, bis(mercaptomethyl) disulfide, bis(mercaptomethyl) disulfide, bis(mercaptopropyl) sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, and 1,4-bis(mercaptoethyl)benzene.

From the viewpoint of high refractive index and high heat resistance as well as high tinting property of the obtained resin, ethylene glycol, diethylene glycol, triethylene glycol, trimethylolpropane, 2-mercaptoethanol, 3-mercaptopropanol, 1,2-ethanedithiol, 1,3-bis(mercaptomethyl)benzene or the like are preferred, and ethylene glycol, diethylene glycol, triethylene glycol, trimethylolpropane, and 2-mercaptoethanol are more preferred. These active hydrogen compounds may be used individually, or as mixtures of two or more kinds. These active hydrogen compounds may be in an oligomer form.

Furthermore, in addition to pentaerythritol tetrakismercaptoacetate and pentaerythritol tetrakismercaptopropionate, another polythiol compound can also be used (hereinafter, the polythiol compound other than pentaerythritol tetrakismercaptoacetate and pentaerythritol tetrakismercaptopropionate is referred to as "other polythiol compound"). Examples of the other polythiol compound include aliphatic polythiol compounds such as trimethylolpropanetris(2-mercaptoacetate), trimethylolpropanetris(3-mercaptopropionate), trimethylolethanetris(2-mercaptoacetate), trimethylolethanetris(3-mercaptopropionate), 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, 2,5-dimercaptomethyl-2,5-dimethyl-1,4-dithiane, and thioglycolic acid and mercaptopropionic acid esters, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), 1,1,3,3-tetrakis(mercaptomethylthio)propane, 1,1,2,2-tetrakis(mercaptomethylthio)ethane, 4,6-bis(mercaptomethylthio)-1,3-dithiacyclohexane, tris(mercaptomethylthio)methane, and tris(mercaptoethylthio)methane;

aromatic polythiol compounds such as 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, 2,6-naphthalenedithiol, 2-methylamino-4,6-dithiol-sym-triazine, 3,4-thiophene dithiol, bismuthiol, 4,6-bis(mercaptomethylthio)-1,3-dithiane, and 2-(2,2,-bis(mercaptomethylthio)ethyl)-1,3-dithiethane;

heterocyclic polythiol compounds such as 2-methylamino-4,6-dithiol-sym-triazine, 3,4-thiophenedithiol, bismuthiol, 4,6-bis(mercaptomethylthio)-1,3-dithiane, and 2-(2,2-bis(mercaptomethylthio)ethyl)-1,3-dithiethane; or the like. However, the examples are not limited to these exemplary compounds.

Furthermore, oligomers or halogen-substituted forms such as chlorine-substituted forms or bromine-substituted forms of pentaerythritol tetrakismercaptoacetate, pentaerythritol tetrakismercaptopropionate, active hydrogen compounds, and other polythiol compounds may be added to the polymerizable composition for an optical material of the invention. These compounds can be used individually or as mixtures of two or more kinds.

Furthermore, the tolylene diisocyanate and aliphatic polyisocyanate having 4 to 8 carbon atoms used in the one embodiment, and the other isocyanate compounds that are added as necessary (hereinafter, referred to as "isocyanate compounds) may be products obtained by preliminarily reacting polythiol with a part of the active hydrogen compounds or the other polythiol compounds. Also, the polythiols used in the invention may be products obtained by preliminarily reacting the polythiols with a part of isocyanate compounds.

Examples of an epoxy compound that can be added as a resin modifying agent include:

a phenolic epoxy compound obtainable by a condensation reaction of a polyhydric phenol compound and an epihalohydrin compound, such as bisphenol A glycidyl ether;

an alcohol-based epoxy compound obtainable by condensation of a polyhydric alcohol compound and an epihalohydrin compound, such as hydrogenated bisphenol A glycidyl ether;

a glycidyl ester-based epoxy compound obtainable by condensation of a polyvalent organic acid and an epihalohydrin compound, such as 3,4-epoxycyclohexylmethyl-3',4'-epoxycyclohexanecarboxylate;

an amine-based epoxy compound obtainable by condensation of a primary or secondary diamine and an epihalohydrin compound;

an aliphatic polyvalent epoxy compound such as vinylcyclohexene diepoxide; or the like. However, the examples are not limited to these exemplary compounds.

Examples of an episulfide compound that can be added as a resin modifying agent include:

chain-like aliphatic 2,3-epithiopropylthio compounds such as bis(2,3-epithiopropylthio)sulfide, bis(2,3-epithiopropylthio)disulfide, bis(2,3-epithiopropylthio)methane, 1,2-bis(2,3-epithiopropylthio)ethane, and 1,5-bis(2,3-epithiopropylthio)-3-thiaphene;

2,3-epithiopropylthio compounds having alicyclic heterocyclic rings, such as 1,3-bis(2,3-epithiopropylthio)cyclohexane, and 2,5-bis(2,3-epithiopropylthiomethyl)-1,4-dithiane;

aromatic 2,3-epithiopropylthio compounds such as 1,3-bis(2,3-epithiopropylthio)benzene and 1,4-bis(2,3-epithiopropylthio)benzene; or the like. However the examples are not limited to these exemplary compounds.

Examples of an organic acid and an anhydride thereof that can be added as resin modifying agents include:

thiodiglycolic acid, thiodipropionic acid, dithiodipropionic acid, phthalic anhydride, hexahydrophthalic anhydride, methylhexahydrophthalic anhydride, methyltetrahydrophthalic anhydride, maleic anhydride, trimellitic anhydride, pyromellitic anhydride or the like, but the examples are not limited to these exemplary compounds.

Examples of an olefin compound that can be added as a resin modifying agent include:

(meth)acrylate compounds such as benzyl acrylate, benzyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, neopentyl glycol diacrylate, neopentyl glycol dimethacrylate, ethylene glycol bisglycidyl acrylate, ethylene glycol bisglycidyl methacrylate, bisphenol A diacrylate, bisphenol A dimethacrylate, bisphenol F diacrylate, bisphenol F dimethacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, xylylene dithiol diacrylate, xylylene dithiol dimethacrylate, mercaptoethyl sulfide diacrylate, and mercaptoethyl sulfide dimethacrylate;

allyl compounds such as allyl glycidyl ether, diallyl phthalate, diallyl terephthalate, diallyl isophthalate, and diethylene glycol bisallyl carbonate;

vinyl compounds such as styrene, chlorostyrene, methylstyrene, bromostyrene, dibromostyrene, divinylbenzene, and 3,9-divinylspirobi(m-dioxane); or the like, but the examples are not limited to these exemplary compounds.

These resin modifying agents can be used individually or as mixtures of two or more kinds.

The use ratio of the isocyanate compounds and the active hydrogen compound used in the invention is usually such that the molar ratio of the functional groups (NCO+NCS)/(SH+OH) is usually in the range of 0.8 to 1.5, preferably in the range of 0.8 to 1.2, more preferably in the range of 0.8 to 1.1, and even more preferably in the range of 0.85 to 1.05, based on the polymerizable composition for an optical material.

The invention also provides an optical material obtained by curing the polymerizable composition for an optical material described above.

Here, the refractive index of the optical material can be regulated by the type and composition ratios of the isocyanate compounds and active hydrogen compounds in the polymerizable composition, as desired. Particularly, it is demanded that the optical material of the one embodiment has a high refractive index, and from this point of view, it is preferable to use, for example, a combination and composition ratio of isocyanate compounds and active hydrogen compounds that are capable of obtaining a resin having a refractive index of usually 1.55 or greater, and preferably 1.59 or greater, as a refractive index measured at e-line.

The optical material of the invention is also excellent in light resistance. Here, light resistance can be evaluated based on the measurement value of changes (hereinafter, referred to as "ΔYI") in the yellow index (hereinafter, referred to as "YI") after light irradiation for 48 hours, as measured by a QW tester. It is preferable that the ΔYI value of an optical material is as small as possible, from the viewpoint of having excellent light resistance, but the ΔYI is usually 10.0 or less, preferably 7.0 or less, and more preferably 6.0 or less. The lower limit is not particularly limited, but for example, the lower limit is adjusted to 0.1 or greater.

The heat resistance of the optical material of the invention is preferably 90 degrees C. or higher, more preferably 95 degrees C. or higher, and even more preferably 100 degrees C. or higher.

The optical material of the invention is excellent in tinting property. The tinting property as used in the invention means the ease of being tinted when the optical material is tinted by immersing in a tinting dispersion liquid which has been prepared by adding a tinting agent in purified water. Specifically, being excellent in tinting property means that when a tinted lens piece is scanned with a UV spectrophotometer (UV-1600 manufactured by Shimadzu Corp.) in the wavelength range of 400 nm to 800 nm, the transmittance (% T) value at the maximum absorption wavelength, 565 nm, is small.

Here, the tinting property of the optical material of the invention is, as expressed as the transmittance (% T) value that will be described later, preferably 60% T or less, more preferably 50% T or less, and even more preferably 45% T or less.

From another point of view, the invention provides a method for producing an optical material by curing the polymerizable composition, for example, a method for producing an optical material by molding the polymerizable composition by cast polymerization using a mold for lens casting.

In order to mold by curing the mixture of isocyanate compounds and active hydrogen compounds, which is the polymerizable composition for an optical material, the polymerization catalyst described in WO 2010/001550, a catalyst such as dialkyltin dichloride (specifically, dialkyltin dichloride having an alkyl group having 1 to 4 carbon atoms, for example, dimethyltin dichloride, dibutyltin dichloride) (hereinafter, also referred to as "curing catalyst"), and an ultraviolet absorber such as a benzotriazole compound, an internal releasing agent such as acidic phosphoric acid ester, a photostabilizer, an antioxidant, a reaction initiator such as a radical reaction initiator, a chain extending agent, a crosslinking agent, a coloring preventing agent, an oil-soluble tinting agent, and a filler may also be added using the same techniques as those used in known molding methods as necessary.

When a feed solution is prepared by mixing the isocyanate compounds and active hydrogen compounds with a reaction catalyst, a mold releasing agent or other additives, the addition of the catalyst, releasing agent or other additives is dependent on the solubility of the isocyanate compounds and the active hydrogen compounds, but the catalyst, releasing agent or other additives may be added and dissolved in the isocyanate compounds in advance, may be added and dissolved in the active hydrogen compounds, or may be added and dissolved in a mixture of the isocyanate compounds and active hydrogen compounds. Alternatively, a master solution may be prepared by dissolving the materials in a portion of the isocyanate compounds or active hydrogen compounds prepared for use, and then this master solution may be added to the composition. The order of addition is not limited to these exemplary methods, and is appropriately selected on the basis of operability, safety, convenience or the like.

Mixing is usually carried out at a temperature of 30 degrees C. or lower. From the viewpoint of the pot life of the mixture, it may be preferable to carry out the mixing at a lower temperature. Furthermore, when an additive such as a catalyst or a releasing agent does not exhibit good solubility in the isocyanate compounds and active hydrogen compounds, the additive may be warmed in advance and then dissolved in the isocyanate compounds, active hydrogen compounds or a mixture thereof.

Furthermore, depending on the properties demanded from obtainable plastic lenses, it is often preferable to carry out a defoaming treatment under reduced pressure, a filtration treatment under pressure or under reduced pressure, or the like according to necessity.

Subsequently, a mold for lens casting in which the mixture of isocyanate compounds and the active hydrogen compounds has been fed and a polarizing film is fixed, is heated in an oven or in an apparatus capable of heating in water, over several hours to several ten hours under a predetermined temperature program, to perform molding by curing.

The temperature for polymerization curing cannot be defined because the conditions may vary with the composition of the mixture, type of the catalyst, shape of the mold or the like, but the polymerization curing is carried out at a temperature of approximately −50 degrees C. to 200 degrees C. for 1 hour to 100 hours.

Typically, it is general to initiate the polymerization curing at temperature in the range of 5 degrees C. to 40 degrees C., followed by slowly raising the temperature to the range of 80 degrees C. to 130 degrees C., and to keep heating at the temperature for 1 hour to 4 hours.

After completion of the polymerization curing, the product is removed from the mold for lens casting, and thus a plastic lens is obtained.

The plastic lens that is obtained from the optical material of the one embodiment is preferably subjected to an annealing treatment by heating the lens released from the mold, for the purpose of alleviating the strain due to polymerization. The annealing temperature is usually in the range of 80 degrees C. to 150 degrees C., preferably in the range of 100 degrees C. to 130 degrees C., and more preferably in the range of 110 degrees C. to 130 degrees C. The annealing time is usually in the range of 0.5 hours to 5 hours, and preferably in the range of 1 hour to 4 hours.

The plastic lens that is obtained from the optical material of the one embodiment is used after a coating layer is provided on one surface or on both surfaces as necessary. Examples of the coating layer include a primer layer, a hard coating layer, an anti-reflective coating layer, an anti-fog coating layer, an anti-fouling layer, a water-repellent layer, or the like. These coating layers may be used individually, or a plurality of coating layers may be integrated into a multilayer and used. In the case of providing coating layers on both surfaces, identical coating layers may be provided on the respective surfaces, or different coating layers may be provided.

In these coating layers, an ultraviolet absorber for the purpose of protecting the lens or the eye from ultraviolet rays; an infrared absorber for the purpose of protecting the eye from infrared rays; a photostabilizer or an antioxidant for the purpose of enhancing weather resistance of the lens; a tinting agent or a pigment, more specifically, a photochromic tinting agent or a photochromic pigment, for the purpose of increasing the stylishness of the lens; an antistatic agent; and other known additives for the purpose of enhancing the performance of the lens, also be used in combination. Various leveling agents may also be used for the purpose of improving coatability.

The primer layer is generally formed between the lens base material (the optical material obtainable from the polymerizable composition of the one embodiment) and a hard coating layer, for the purpose of enhancing the adhesiveness of the hard coating layer or the impact resistance of the plastic lens, and the layer thickness is usually about 0.1 μm to 10 μm.

The primer layer is formed by, for example, a coating method or a dry method. In the coating method, the primer layer is formed by applying a primer composition by a known coating method such as spin coating or dip coating, and solidifying the composition. In the dry method, the primer layer is formed by a known dry method such as a CVD method or a vacuum deposition method. Upon forming the primer layer, the surface of the lens may be subjected to a pretreatment such as alkali treatment, plasma treatment or ultraviolet radiation treatment as necessary, for the purpose of enhancing adhesiveness.

In regard to the primer composition, a material having high adhesiveness to the lens base material (the optical material obtainable from the polymerizable composition of the one embodiment) when solidified into a primer layer is preferable, and usually, a primer composition containing a urethane resin, an epoxy resin, a polyester resin, a melamine resin, or polyvinyl acetal as a main component, or the like is used. The primer composition can be used without solvent, but an appropriate solvent that does not affect the lens may be used for the purpose of adjusting the viscosity of the composition.

The hard coating layer is a coating layer intended to impart functions such as scratch resistance, abrasion resistance, moisture resistance, warm water resistance, heat resistance and weather resistance to the lens surface, and the layer thickness is usually about 0.3 μm to 30 μm.

The hard coating layer is formed by applying a hard coat composition by a known coating method such as spin coating or dip coating, and then curing the composition. Examples of the curing method include heat curing, curing by irradiation with an energy ray such as ultraviolet rays or visible rays, and so on. Upon forming the hard coating layer, the surface to be coated (lens base material or primer layer) may be subjected to pretreatment such as alkali treatment, plasma treatment or ultraviolet radiation treatment as necessary, for the purpose of enhancing adhesiveness.

As the hard coat composition, generally mixtures of curable organosilicon compounds and oxide microparticles of Si, Al, Sn, Sb, Ta, Ce, La, Fe, Zn, W, Zr, In and Ti (including composite oxide microparticles) are often used. In addition to these, amines, amino acids, metal acetylacetonate complexes, organic acid metal salts, perchloric acids, salts of perchloric acids, acids, metal chlorides, polyfunctional epoxy compounds or the like may also be used. The hard coat composition may be used without solvent, but an appropriate solvent that does not affect the lens may also be used.

The anti-reflective layer is usually formed on the hard coating layer, if necessary. The anti-reflective layer may be an inorganic layer or an organic layer, and an inorganic layer is often formed by a dry method such as a vacuum deposition method, a sputtering method, an ion plating method, an ion beam assist method or a CVD method, generally using an inorganic oxide such as $SiO_2$ or $TiO_2$. An organic layer is often formed by a wet method, generally using a composition containing an organosilicon compound and silica microparticles having an internal cavity.

The antireflection layer may be a single layer or a multilayer, but when the antireflection layer is used as a single layer, it is preferable that the refractive index of the antireflection layer is lower than the refractive index of the hard coating layer, by at least 0.1 or more. In order to exhibit the antireflection function more effectively, it is preferable to prepare the layer as a multilayer antireflection film, and in that case, typically, a low-refractive index film and a high-refractive index film are alternately laminated. In this case as well, it is preferable that the difference in refractive indices between the low-refractive index film and the high-refractive index film is 0.1 or more. Examples of the high-refractive index film include films of ZnO, $TiO_2$, $CeO_2$, $Sb_2O_5$, $SnO_2$, $ZrO_2$, $Ta_2O_5$ or the like, and examples of the low-refractive index film include $SiO_2$ film or the like. The film thickness is usually about 50 nm to 150 nm.

Furthermore, the plastic lens that is obtained from the optical material of the one embodiment may be subjected to rear surface polishing, an antistatic treatment, a tinting treatment, a photochromic treatment or the like, according to necessity.

Since such a plastic lens can be made thin, it is useful as a spectacles lens, and particularly as a vision corrective lens, and since the plastic lens has excellent tinting property, it is rich in stylishness.

EXAMPLES

Hereinafter, the invention will be described in more detail with reference to Examples, but the invention is not limited to these Examples.

A lens obtained by polymerization was evaluated by performing a performance test. The performance test evaluated color, refractive index/Abbe number, heat resistance, specific gravity and tinting property, by the following testing methods.

Color: A flat resin plate having a thickness of 9 mm was produced, and the yellow index (YI) was measured with a colorimeter (CR-200 manufactured by Minolta Co., Ltd.).

Refractive index (ne) Abbe number (ve): Measurement was made at 20 degrees C. using a Pulfrich refractometer KPR-30 manufactured by Shimadzu Corp.

Heat resistance: The glass transition temperature (Tg) measured by a TMA penetration method (load of 50 g, pincher 0.5 mmϕ) using TMA-60 manufactured by Shimadzu Corp. was designated as the heat resistance.

Specific gravity: Measurement was made by Archimedes' method at 20 degrees C.

Tinting property: A tinting dispersion liquid was prepared by adding, as tinting agents, 1.5 g of "MLP-Blue", 2.0 g of "MLP-Yellow" and 1.5 g of "MLP-Red", which are dispersion tints for spectacle lenses manufactured by Mitsui Chemicals Inc. to 995 g of purified water. This dispersion liquid was heated to 90 degrees C., and then a plastic lens piece having a thickness of 9 mm was tinted by immersing therein for 5 minutes at 90 degrees C. The tinted lens piece was scanned over a wavelength range of 400 nm to 800 nm using a UV spectrophotometer (UV-1600 manufactured by Shimadzu Corp.), and the transmittance (% T) at the maximum absorption wavelength, 565 nm, was measured.

Light resistance test: A flat resin plate having a thickness of 2 mm was produced and was irradiated for 48 hours using a QUV tester (manufactured by Q-Lab, Inc.), and then ΔYI was measured from the resin color before and after the irradiation. (The QUV test was carried out under conditions of a luminance of 0.35 W/m² and a black panel temperature of 50 degrees C., using UVB-340 as a light source.)

Example 1

26.4 g of tolylene diisocyanate (Cosmonate T-80 (Lot No.: K09B26302) manufactured by Mitsui Chemicals, Inc.) and 13.7 g of hexamethylene diisocyanate were mixed and dissolved, and 0.01 g of dimethyltin dichloride as a curing catalyst, 1.50 g of Biosorb 583 as an ultraviolet absorber, and 0.10 g of Zelec UN (acidic phosphoric acid ester: registered trademark, manufactured by Stepan Company) as an internal releasing agent, were added thereto. The resulting mixture was mixed and dissolved at 20 degrees C. After dissolving the materials, 59.9 g of pentaerythritol tetrakismercaptopropionate was added to the solution, and the mixture was mixed and dissolved to obtain a uniform solution. This uniform solution was defoamed at 600 Pa for 1 hour, and then was filtered through a 1-μm Teflon (registered trademark) filter. The filtered solution was fed into a mold formed from a glass mold and tapes. This mold was placed in an oven, and polymerization was carried out by slowly increasing the temperature from 25 degrees C. to 120 degrees C. approximately over 24 hours. After completion of polymerization, the mold was taken out from the oven, and the resin was obtained by releasing from the mold. The obtained resin was annealed for 4 hours at 120 degrees C. The obtained resin had a YI value of 7.9, a refractive index (ne) of 1.595, an Abbe number (ve) of 32, a heat resistance of 98 degrees C., a resin specific gravity of 1.34, and a light resistance (48 hours) ΔYI value of 6.6. The transmittance at 565 nm of the obtained resin after tinting was 29% T.

Examples 2 to 8 and Comparative Examples 1 to 3

Polymerization was carried out with the monomer compositions shown in Table 1 under the same conditions as those used in Example 1 in terms of the types and amounts of addition of the curing catalyst, ultraviolet absorber and internal releasing agent, and the curing conditions. The properties of the obtained resin are summarized in Table 1.

Example 9

Polymerization was carried out with the monomer compositions shown in Table 1, under the same conditions as those used in Example 1 in terms of the type and amount of addition of the internal releasing agent, and the curing conditions, except that 0.01 g of dibutyltin dichloride was used as a curing catalyst. Cosmonate T-100 (Lot No.: K09B04505) manufactured by Mitsui Chemicals, Inc. was used as tolylene diisocyanate. The properties of the obtained resin are summarized in Table 1.

TABLE 1

| | Monomer Composition (g) | Color [YI] | Refractive index [ne] | Abbe Number [ve] | Heat resistance [degree C.] | Specific gravity | Tinting property [565 nm/% T] | Light resistance [48HR]ΔYI |
|---|---|---|---|---|---|---|---|---|
| Example 1 | A-1 (26.4)/B-1 (13.7) C-1 (59.9) | 7.9 | 1.595 | 32 | 98 | 1.34 | 29 | 6.6 |
| Example 2 | A-1 (35.2)/B-1 (18.3) C-1 (31.9)/D-1 (14.6) | 6.7 | 1.601 | 31 | 107 | 1.33 | 15 | 4.0 |
| Example 3 | A-1 (34.1)/B-1 (8.4) C-1 (53.6)/D-2 (3.9) | 6.0 | 1.598 | 31 | 97 | 1.34 | 24 | 9.8 |
| Example 4 | A-1 (33.7)/B-1 (8.1) C-1 (52.8)/D-3 (5.4) | 7.6 | 1.597 | 31 | 103 | 1.34 | 20 | — |
| Example 5 | A-1 (34.8)/B-1 (8.4) C-1 (54.5)/D-4 (2.3) | 6.9 | 1.601 | 30 | 115 | 1.35 | 41 | — |
| Example 6 | A-1 (34.5)/B-1 (8.3) C-1 (53.8)/D-5 (3.4) | 8.4 | 1.599 | 31 | 116 | 1.34 | 59 | — |

TABLE 1-continued

|  | Monomer Composition (g) | Color [YI] | Refractive index [ne] | Abbe Number [ve] | Heat resistance [degree C.] | Specific gravity | Tinting property [565 nm/% T] | Light resistance [48HR]ΔYI |
|---|---|---|---|---|---|---|---|---|
| Example 7 | A-1 (35.8)/B-2 (17.1) C-1 (32.3)/D-1 (14.8) | 6.7 | 1.604 | 30 | 107 | 1.34 | 23 | — |
| Example 8 | A-1 (36.4)/B-1 (18.9) C-2 (29.6)/D-1 (15.1) | 9.7 | 1.606 | 31 | 116 | 1.36 | 42 | — |
| Comp. Ex. 1 | A-2 (50.8) C-1 (25.6)/C-3 (23.9) | 5.6 | 1.598 | 39 | 113 | 1.31 | 67 | 0.8 |
| Comp. Ex. 2 | A-3 (43.6) C-1 (56.4) | 5.9 | 1.598 | 36 | 93 | 1.36 | 20 | — |
| Comp. Ex. 3 | A-1 (41.9)/B-1 (10.1) C-3 (43.2)/D-1 (4.8) | 9.6 | 1.666 | 27 | 116 | 1.35 | 69 | 4.4 |
| Example 9 | A-1-1 (35.2)/B-1 (18.3) C-1 (31.9)/D-1 (14.6) | 5.6 | 1.602 | 30 | 100 | 1.33 | 7 | 4.8 |

Examples 10 to 15

Polymerization was carried out with the monomer compositions shown in Table 2, under the same conditions as those used in Example 1 in terms of the types and amounts of addition of the curing catalyst, ultraviolet absorber and internal releasing agent, and the curing conditions. The properties of the obtained resins are summarized in Table 2.

TABLE 2

|  | Monomer Composition (g) | Color [YI] | Refractive index [ne] | Abbe Number [ve] | Heat resistance [degree C.] | Specific gravity | Tinting property [565 nm/% T] | Light resistance [48HR]ΔYI |
|---|---|---|---|---|---|---|---|---|
| Example 10 | A-1 (34.4)/B-1 (17.9) C-1 (32.7)/D-1 (15.0) | 6.1 | 1.600 | 31 | 97 | 1.33 | 8 | 4.4 |
| Example 11 | A-1 (33.6)/B-1 (17.5) C-1 (33.5)/D-1 (15.4) | 6.1 | 1.600 | 31 | 90 | 1.33 | 4 | 5.4 |
| Example 12 | A-1 (30.9)/B-1 (16.1) C-1 (44.0)/D-1 (9.0) | 6.1 | 1.599 | 31 | 100 | 1.33 | 13 | 4.2 |
| Example 13 | A-1 (30.0)/B-1 (15.6) C-1 (44.7)/D-1 (9.7) | 6.0 | 1.598 | 31 | 91 | 1.33 | 4 | 5.6 |
| Example 14 | A-1 (34.1)/B-1 (8.4) C-1 (53.6)/D-2 (3.9) | 8.0 | 1.600 | 30 | 106 | 1.35 | 38 | 6.5 |
| Example 15 | A-1 (33.3)/B-1 (8.1) C-1 (54.6)/D-2 (4.0) | 7.3 | 1.598 | 31 | 100 | 1.35 | 23 | 6.8 |

Example 16

The curing catalyst (polymerization catalyst) described in Example A1 of WO 2010/001550 was used as a curing catalyst. Specifically, polymerization was carried out with the monomer composition shown in Table 3 under the same conditions as those used in Example 1 in terms of the types and amounts of addition of the ultraviolet absorber and internal releasing agent, and the curing conditions, except that 26.4 g of tolylene diisocyanate (Cosmonate T-80 (Lot No.: K09B26302), manufactured by Mitsui Chemicals, Inc.) and 13.7 g of hexamethylene diisocyanate were mixed and dissolved, and 0.20 g of a mixture of 0.17 g of a solution of tri-n-octylmethylammonium chloride in isopropyl alcohol (containing 25% of isopropanol) (manufactured by Lion Akzo Co., Ltd.) and 0.03 g of methanesulfonic acid (manufactured by Tokyo Chemical Industry Co., Ltd.), which had been thoroughly mixed in advance, and 0.02 g of zinc dibutyldithiocarbamate (manufactured by Kawaguchi Chemical Industry Co., Ltd.) were added as a curing catalyst. The properties of the obtained resin are summarized in Table 3.

Examples 17 to 20

Polymerization was carried out with the monomer compositions shown in Table 3 under the same conditions as those used in Example 1 in terms of the types and amounts of addition of the ultraviolet absorber and internal releasing agent, and the curing conditions, except that 0.01 g of dibutyltin dichloride was used as a curing catalyst. The properties of the obtained resins are summarized in Table 3.

TABLE 3

|  | Monomer Composition (g) | Color [YI] | Refractive index [ne] | Abbe Number [ve] | Heat resistance [degree C.] | Specific gravity | Tinting property [565 nm/% T] | Light resistance [48HR]ΔYI |
|---|---|---|---|---|---|---|---|---|
| Example 16 | A-1 (26.4)/B-1 (13.7) C-1 (59.9) | 7.1 | 1.596 | 32 | 96 | 1.34 | 24 | 6.1 |
| Example 17 | A-1 (34.5)/B-1 (9.0)/A-2 (11.0) C-1 (31.2)/D-1 (14.3) C-1 (33.5)/D-1 (15.4) | 6.5 | 1.602 | 31 | 117 | 1.33 | 39 | 3.3 |
| Example 18 | A-1 (34.4)/B-1 (17.9) C-1 (32.7)/D-1 (15.0) | 6.1 | 1.601 | 31 | 98 | 1.33 | 10 | 4.3 |

TABLE 3-continued

|  | Monomer Composition (g) | Color [YI] | Refractive index [ne] | Abbe Number [ve] | Heat resistance [degree C.] | Specific gravity | Tinting property [565 nm/% T] | Light resistance [48HR]ΔYI |
|---|---|---|---|---|---|---|---|---|
| Example 19 | A-1 (33.7)/B-1 (17.5) C-1 (33.5)/D-1 (15.3) | 6.1 | 1.600 | 31 | 92 | 1.33 | 5 | 5.0 |
| Example 20 | A-1 (36.1)/B-1 (18.8) C-1 (31.0)/D-1 (14.1) | 7.5 | 1.602 | 30 | 114 | 1.33 | 27 | 3.1 |

Example 21

20.0 g of tolylene diisocyanate (Cosmonate T-80 (Lot No.: K09B26302) manufactured by Mitsui Chemicals, Inc.) and 20.0 g of hexamethylene diisocyanate were mixed and dissolved, and 0.01 g of dimethyltin dichloride as a curing catalyst, 1.50 g of Biosorb 583 as an ultraviolet absorber, and 0.10 g of Zelec UN (acidic phosphoric acid ester: registered trademark, manufactured by Stepan Company) as an internal releasing agent, were added thereto. The resulting mixture was mixed and dissolved at 20 degrees C. After dissolving the materials, 60.0 g of pentaerythritol tetrakismercaptopropionate was added to the solution, and the mixture was mixed and dissolved to obtain a uniform solution. This uniform solution was defoamed at 600 Pa for 1 hour, and then was filtered through a 1-μm Teflon (registered trademark) filter. The filtered solution was fed into a mold formed from a glass mold and tapes. This mold was placed in an oven, and polymerization was carried out by slowly increasing the temperature from 25 degrees C. to 120 degrees C. approximately over 24 hours. After completion of polymerization, the mold was taken out from the oven, and the resin was obtained by releasing from the mold. The obtained resin was annealed for 4 hours at 120 degrees C. The obtained resin had a YI value of 7.7, a refractive index (ne) of 1.587, an Abbe number (ve) of 34, a heat resistance of 91 degrees C., a resin specific gravity of 1.33, and a light resistance (48 hours) ΔYI value of 4.2. The transmittance at 565 nm of the obtained resin after tinting was 17% T.

Example 22

24.1 g of tolylene diisocyanate (Cosmonate T-80 (Lot No.: K09B26302) manufactured by Mitsui Chemicals, Inc.) and 16.1 g of hexamethylene diisocyanate were mixed and dissolved, and 0.01 g of dimethyltin dichloride as a curing catalyst, 1.50 g of Biosorb 583 as an ultraviolet absorber, and 0.10 g of Zelec UN (acidic phosphoric acid ester: registered trademark, manufactured by Stepan Company) as an internal releasing agent, were added thereto. The resulting mixture was mixed and dissolved at 20 degrees C. After dissolving the materials, 59.8 g of pentaerythritol tetrakismercaptopropionate was added to the solution, and the mixture was mixed and dissolved to obtain a uniform solution. This uniform solution was defoamed at 600 Pa for 1 hour, and then was filtered through a 1-μm Teflon (registered trademark) filter. The filtered solution was fed into a mold formed from a glass mold and tapes. This mold was placed in an oven, and polymerization was carried out by slowly increasing the temperature from 25 degrees C. to 120 degrees C. approximately over 24 hours. After completion of polymerization, the mold was taken out from the oven, and the resin was obtained by releasing from the mold. The obtained resin was annealed for 4 hours at 120 degrees C. The obtained resin had a YI value of 7.9, a refractive index (ne) of 1.593, an Abbe number (ve) of 32, a heat resistance of 98 degrees C., a resin specific gravity of 1.34, and a light resistance (48 hours) ΔYI value of 4.5. The transmittance at 565 nm of the obtained resin after tinting was 22% T.

Example 23

28.2 g of tolylene diisocyanate (Cosmonate T-80 (Lot No.: K09B26302) manufactured by Mitsui Chemicals, Inc.) and 12.1 g of hexamethylene diisocyanate were mixed and dissolved, and 0.01 g of dimethyltin dichloride as a curing catalyst, 1.50 g of Biosorb 583 as an ultraviolet absorber, and 0.10 g of Zelec UN (acidic phosphoric acid ester: registered trademark, manufactured by Stepan Company) as an internal releasing agent, were added thereto. The resulting mixture was mixed and dissolved at 20 degrees C. After dissolving the materials, 59.7 g of pentaerythritol tetrakismercaptopropionate was added to the solution, and the mixture was mixed and dissolved to obtain a uniform solution. This uniform solution was defoamed at 600 Pa for 1 hour, and then was filtered through a 1-μm Teflon (registered trademark) filter. The filtered solution was fed into a mold formed from a glass mold and tapes. This mold was placed in an oven, and polymerization was carried out by slowly increasing the temperature from 25 degrees C. to 120 degrees C. approximately over 24 hours. After completion of polymerization, the mold was taken out from the oven, and the resin was obtained by releasing from the mold. The obtained resin was annealed for 4 hours at 120 degrees C. The obtained resin had a YI value of 8.1, a refractive index (ne) of 1.598, an Abbe number (ve) of 31, a heat resistance of 104 degrees C., a resin specific gravity of 1.35, and a light resistance (48 hours) ΔYI value of 4.6. The transmittance at 565 nm of the obtained resin after tinting was 36% T.

Example 24

51.1 g of tolylene diisocyanate (Cosmonate T-80 (Lot No.: K09B26302) manufactured by Mitsui Chemicals, Inc.) and 2.7 g of hexamethylene diisocyanate were mixed and dissolved, and 0.01 g of dimethyltin dichloride as a curing catalyst, 1.50 g of Biosorb 583 as an ultraviolet absorber, and 0.10 g of Zelec UN (acidic phosphoric acid ester: registered trademark, manufactured by Stepan Company) as an internal releasing agent, were added thereto. The resulting mixture was mixed and dissolved at 20 degrees C. After dissolving the materials, 31.7 g of pentaerythritol tetrakismercaptopropionate and 14.5 g of 2 mercaptoethanol was added to the solution, and the mixture was mixed and dissolved to obtain a uniform solution. This uniform solution was defoamed at 600 Pa for 1 hour, and then was filtered through a 1-μm Teflon (registered trademark) filter. The filtered solution was fed into a mold formed from a glass mold and tapes. This mold was placed in an oven, and polymerization was carried out by slowly increasing the temperature from 25 degrees C. to 120 degrees C. approximately over 24 hours. After completion of polymerization, the mold was taken out from the oven, and the resin was obtained by releasing from the mold. The obtained resin was annealed for 4 hours at 120 degrees C. The obtained resin had a YI value of 7.5, a refractive index (ne) of 1.620, an Abbe number (ye) of 28, a heat resistance of 117 degrees C., a resin specific gravity of 1.35. The transmittance at 565 nm of the obtained resin after tinting was 59% T.

Example 25

48.4 g of tolylene diisocyanate (Cosmonate T-80 (Lot No.: K09B26302) manufactured by Mitsui Chemicals, Inc.) and 5.4 g of hexamethylene diisocyanate were mixed and dissolved, and 0.01 g of dimethyltin dichloride as a curing catalyst, 1.50 g of Biosorb 583 as an ultraviolet absorber, and 0.10 g of Zelec UN (acidic phosphoric acid ester: registered trademark, manufactured by Stepan Company) as an internal releasing agent, were added thereto. The resulting mixture was mixed and dissolved at 20 degrees C. After dissolving the materials, 31.7 g of pentaerythritol tetrakismercaptopropionate and 14.5 g of 2 mercaptoethanol was added to the solution, and the mixture was mixed and dissolved to obtain a uniform solution. This uniform solution was defoamed at 600 Pa for 1 hour, and then was filtered through a 1-μm Teflon (registered trademark) filter. The filtered solution was fed into a mold formed from a glass mold and tapes. This mold was placed in an oven, and polymerization was carried out by slowly increasing the temperature from 25 degrees C. to 120 degrees C. approximately over 24 hours. After completion of polymerization, the mold was taken out from the oven, and the resin was obtained by releasing from the mold. The obtained resin was annealed for 4 hours at 120 degrees C. The obtained resin had a YI value of 7.1, a refractive index (ne) of 1.617, an Abbe number (ve) of 28, a heat resistance of 111 degrees C., a resin specific gravity of 1.35. The transmittance at 565 nm of the obtained resin after tinting was 45% T.

Example 26

45.7 g of tolylene diisocyanate (Cosmonate T-80 (Lot No.: K09B26302) manufactured by Mitsui Chemicals, Inc.) and 8.1 g of hexamethylene diisocyanate were mixed and dissolved, and 0.01 g of dimethyltin dichloride as a curing catalyst, 1.50 g of Biosorb 583 as an ultraviolet absorber, and 0.10 g of Zelec UN (acidic phosphoric acid ester: registered trademark, manufactured by Stepan Company) as an internal releasing agent, were added thereto. The resulting mixture was mixed and dissolved at 20 degrees C. After dissolving the materials, 31.7 g of pentaerythritol tetrakismercaptopropionate and 14.5 g of 2-mercaptoethanol was added to the solution, and the mixture was mixed and dissolved to obtain a uniform solution. This uniform solution was defoamed at 600 Pa for 1 hour, and then was filtered through a 1-μm Teflon (registered trademark) filter. The filtered solution was fed into a mold formed from a glass mold and tapes. This mold was placed in an oven, and polymerization was carried out by slowly increasing the temperature from 25 degrees C. to 120 degrees C. approximately over 24 hours. After completion of polymerization, the mold was taken out from the oven, and the resin was obtained by releasing from the mold. The obtained resin was annealed for 4 hours at 120 degrees C. The obtained resin had a YI value of 6.9, a refractive index (ne) of 1.604, an Abbe number (ve) of 29, a heat resistance of 109 degrees C., a resin specific gravity of 1.34. The transmittance at 565 nm of the obtained resin after tinting was 41% T.

Example 27

32.1 g of tolylene diisocyanate (Cosmonate 1-80 (Lot No.: K09B26302) manufactured by Mitsui Chemicals, Inc.) and 21.4 g of hexamethylene diisocyanate were mixed and dissolved, and 0.01 g of dimethyltin dichloride as a curing catalyst, 1.50 g of Biosorb 583 as an ultraviolet absorber, and 0.10 g of Zelec UN (acidic phosphoric acid ester: registered trademark, manufactured by Stepan Company) as an internal releasing agent, were added thereto. The resulting mixture was mixed and dissolved at 20 degrees C. After dissolving the materials, 31.9 g of pentaerythritol tetrakismercaptopropionate and 14.6 g of 2-mercaptoethanol was added to the solution, and the mixture was mixed and dissolved to obtain a uniform solution. This uniform solution was defoamed at 600 Pa for 1 hour, and then was filtered through a 1-μm Teflon (registered trademark) filter. The filtered solution was fed into a mold formed from a glass mold and tapes. This mold was placed in an oven, and polymerization was carried out by slowly increasing the temperature from 25 degrees C. to 120 degrees C. approximately over 24 hours. After completion of polymerization, the mold was taken out from the oven, and the resin was obtained by releasing from the mold. The obtained resin was annealed for 4 hours at 120 degrees C. The obtained resin had a YI value of 6.6, a refractive index (ne) of 1.597, an Abbe number (ve) of 31, a heat resistance of 96 degrees C., a resin specific gravity of 1.32. The transmittance at 565 nm of the obtained resin after tinting was 13% T.

The properties of the obtained resins in Example 21 to 27 are summarized in Table 4.

TABLE 4

| | Monomer Composition (g) | Color [YI] | Refractive index [ne] | Abbe Number [ve] | Heat resistance [degree C.] | Specific gravity | Tinting property [565 nm/% T] | Light resistance [48HR]ΔYI | the rario of A-1 to B-1 |
|---|---|---|---|---|---|---|---|---|---|
| Example 21 | A-1 (20.0)/B-1 (20.0) C-1 (60.0) | 7.7 | 1.587 | 34 | 91 | 1.33 | 17 | 4.2 | A-1:B-1 = 50:50 |
| Example 22 | A-1 (24.1)/B-1 (16.1) C-1 (59.8) | 7.9 | 1.593 | 32 | 98 | 1.34 | 22 | 4.5 | A-1:B-1 60:40 |
| Example 23 | A-1 (28.2)/B-1 (12.1) C-1 (59.7) | 8.1 | 1.598 | 31 | 104 | 1.35 | 36 | 4.6 | A-1:B-1 70:30 |
| Example 24 | A-1 (51.1)/B-1 (2.7) C-1 (31.7)/D-1 (14.5) | 7.5 | 1.620 | 28 | 117 | 1.35 | 59 | — | A-1:B-1 95:5 |
| Example 25 | A-1 (48.4)/B-1 (5.4) C-1 (31.7)/D-1 (14.5) | 7.1 | 1.617 | 28 | 111 | 1.35 | 45 | — | A-1:B-1 90:10 |
| Example 26 | A-1 (45.7)/B-1 (8.1) C-1 (31.7)/D-1 (14.5) | 6.9 | 1.604 | 29 | 109 | 1.34 | 41 | — | A-1:B-1 85:15 |
| Example 27 | A-1 (32.1)/B-1 (21.4) C-1 (31.9)/D-1 (14.6) | 6.6 | 1.597 | 31 | 96 | 1.32 | 13 | — | A-1:B-1 60:40 | was mixed and dissolved at 20 degrees C. After dissolving the materials, 31.7 g of pentaerythritol tetrakismercaptopropi- The reference numbers used for the monomer compositions in the Tables 1 to 4 represent the following.

A-1: Tolylene diisocyanate (Cosmonate T-80 (Lot No.: K09B26302) manufactured by Mitsui Chemicals, Inc.)
A-1-1: Tolylene diisocyanate (Cosmonate T-100 (Lot No.: K09B04505) manufactured by Mitsui Chemicals, Inc.)
A-2: Mixture of 2,5-bis(isocyanatomethyl)-bicyclo[2.2.1]heptane and 2,6-bis(isocyanatomethyl)-bicyclo[2.2.1]heptane
A-3: m-xylene diisocyanate
B-1: 1,6-Hexamethylene diisocyanate
B-2: 1,5-Pentane diisocyanate
C-1: Pentaerythritol tetrakismercaptopropionate
C-2: Pentaerythritol tetrakismercaptoacetate
C-3: 4-Mercaptomethyl-1,8-dimercapto-3,6-dithiaoctane
D-1: 2-Mercaptoethanol
D-2: Diethylene glycol
D-3: Triethylene glycol
D-4: Ethylene glycol
D-5: Trimethylolpropane From the results of Tables 1 to 4, it can be seen that the materials of Example 1 to Example 27 are well-balanced materials which have high refractive indices and high heat resistance and also have high tinting property.

On the other hand, the Comparative Example 1 has a high refractive index and high heat resistance, but is inferior in the tinting performance as compared to the materials of the invention. That is, the Comparative Example 1 is excellent only in heat resistance, and has poor tinting property. More specifically, to compare with an example having a close glass transition temperature which serves as an index of heat resistance, the Example 5 has a heat resistance higher than the Comparative Example 1 by 2 degrees C., but both are excellent in heat resistance. However, the Example 5 has better tinting property than the Comparative Example 1 by 26% T.

It is apparent that the present invention is not limited to the above embodiment, and may be modified and changed without departing from the scope and spirit of the invention.

What is claimed is:

1. A polymerizable composition which when polymerized forms a material with optical properties, said polymerizable composition comprising tolylene diisocyanate, an aliphatic polyisocyanate having 4 to 8 carbon atoms and one or more polythiols selected from pentaerythritol tetrakismercaptoacetate and pentaerythritol tetrakismercaptopropionate, wherein the molar ratio (NCO+NCS)/(SH+OH) of the functional groups of isocyanate and any isothiocyanate compounds to polythiols and any active hydrogen compounds is in the range of 0.8 to 1.5.

2. The polymerizable composition according to claim 1, wherein the molar ratio (NCO+NCS)/(SH+OH) of the functional groups of isocyanate and any isothiocyanate compounds to polythiols and any active hydrogen compounds is in the range of 0.8 to 1.1.

3. The polymerizable composition according to claim 1, wherein the molar ratio (NCO+NCS)/(SH+OH) of the functional groups of isocyanate and any isothiocyanate compounds to polythiols and any active hydrogen compounds is in the range of 0.85 to 1.05.

4. The polymerizable composition according to claim 1, wherein the weight ratio of the tolylene diisocyanate to the aliphatic polyisocyanate compound having 4 to 8 carbon atoms is 58 to 92/42 to 2.

5. The polymerizable composition according to claim 1, wherein the weight ratio of the tolylene diisocyanate to the aliphatic polyisocyanate compound having 4 to 8 carbon atoms is 58 to 90/42 to 10.

6. The polymerizable composition according to claim 1, wherein the composition comprises from 20 to 51.1% by weight of the tolylene diisocyanate based on the total weight of the tolylene diisocyanate, aliphatic polyisocyanate having 4 to 8 carbon atoms and one or more polythiols selected from pentaerythritol tetrakismercaptoacetate and pentaerythritol tetrakismercaptopropionate.

7. The polymerizable composition according to claim 1, wherein said aliphatic polyisocyanate having 4 to 8 carbon atoms is one or more polyisocyanates selected from hexamethylene diisocyanate and pentamethylene diisocyanate.

8. The polymerizable composition according to claim 1, wherein the composition consists essentially of tolylene diisocyanate, an aliphatic polyisocyanate having 4 to 8 carbon atoms and one or more polythiols selected from pentaerythritol tetrakismercaptoacetate and pentaerythritol tetrakismercaptopropionate.

9. The polymerizable composition according to claim 1, wherein the polythiols consist essentially of pentaerythritol tetrakismercaptoacetate and pentaerythritol tetrakismercaptopropionate.

10. The polymerizable composition according to claim 1, further comprising an active hydrogen compound containing two or more active hydrogen groups in the molecule.

11. A method for producing an optical material, the method comprising curing the polymerizable composition according to claim 1.

12. The method for producing an optical material according to claim 11, wherein said polymerizable composition is molded by cast polymerization.

* * * * *